S. F. MILLER.
APPARATUS FOR DISCHARGING THE CONTENTS OF SEPTIC OR SETTLING TANKS.
APPLICATION FILED APR. 25, 1908.
899,750.
Patented Sept. 29, 1908.
2 SHEETS—SHEET 1.
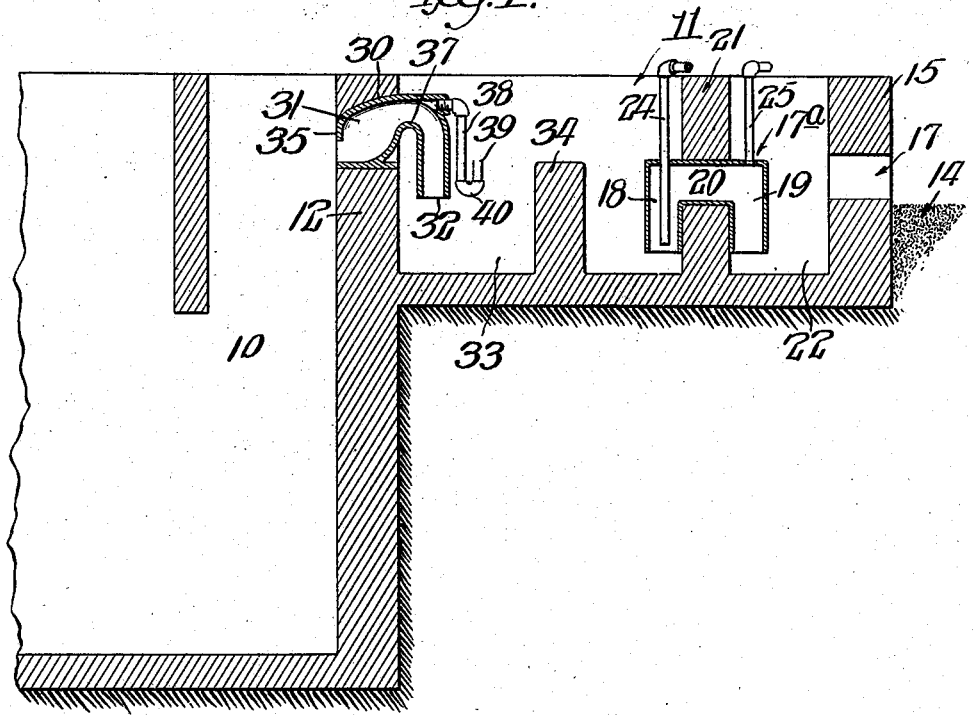
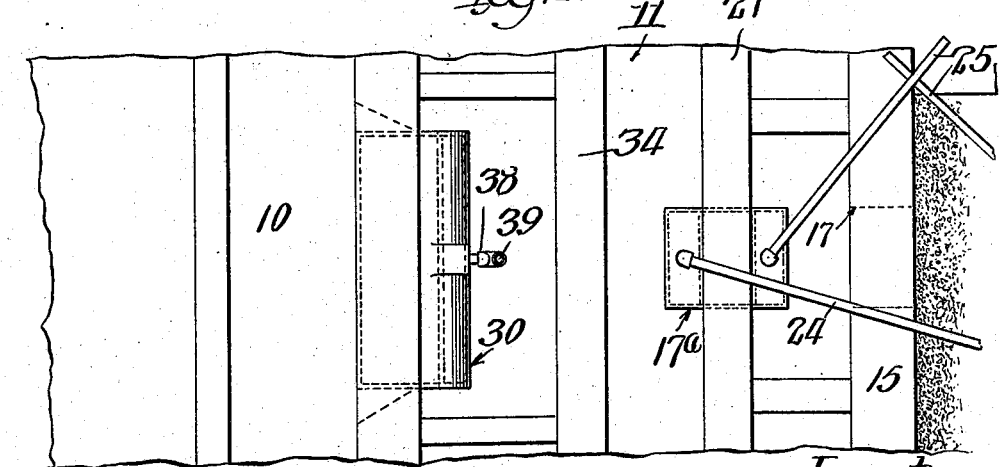
Witnesses:
Inventor
Samuel F. Miller
by
Attys

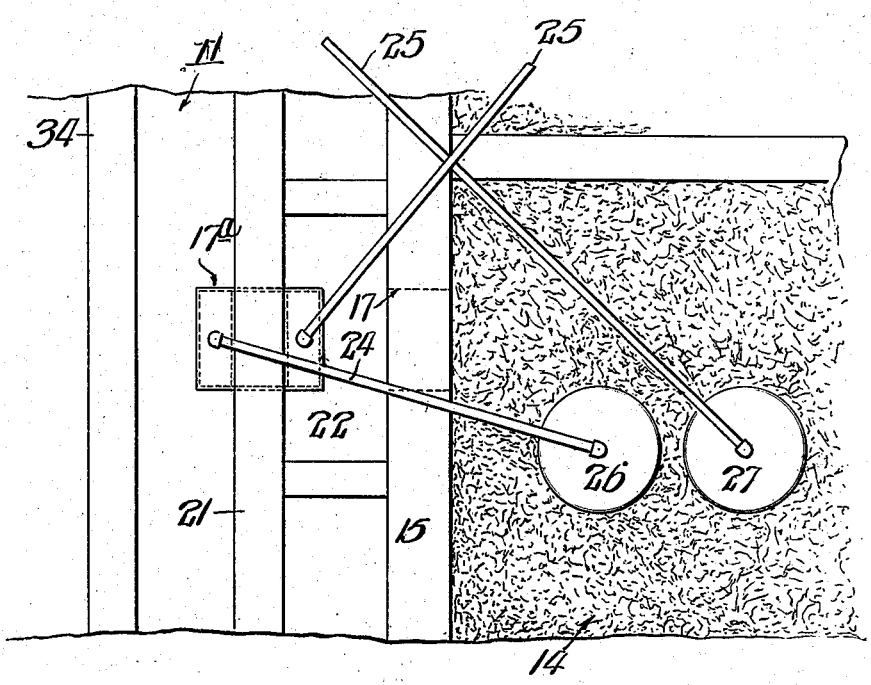

UNITED STATES PATENT OFFICE.

SAMUEL FISHER MILLER, OF CHICAGO, ILLINOIS.

APPARATUS FOR DISCHARGING THE CONTENTS OF SEPTIC OR SETTLING TANKS.

No. 899,750.  Specification of Letters Patent.  Patented Sept. 29, 1908.

Application filed April 25, 1908. Serial No. 429,254.

*To all whom it may concern:*

Be it known that I, SAMUEL FISHER MILLER, a citizen of the United States, and a resident of Chicago, in the county of Cook and State of Illinois, have invented certain new and useful Improvements in Apparatus for Discharging the Contents of Septic or Settling Tanks and the Like; and I do hereby declare that the following is a full, clear, and exact description thereof, reference being had to the accompanying drawings, and the letters of reference marked thereon, which form a part of this specification.

This invention relates to improvements in apparatus for controlling the flow of liquid from a septic or settling tank of a sewage purifying system, and from other tanks, and refers more specifically to means for intermittently withdrawing relatively large volumes of a predetermined quantity of sewage or other liquid from such tank or tanks with a small loss of head.

The invention consists in matters hereinafter set forth and more particularly pointed out in the appended claims.

My invention is herein shown as used in connection with a sewage purifying system and is arranged for intermittently withdrawing liquid sewage from the septic or settling tank of said system and discharging the liquid sewage upon a contact or filter bed for further treatment. Said improvements are adapted for use in such systems either where the liquid sewage is discharged from the septic or settling tank directly upon the contact or filter beds, or is discharged into a distributing chamber from which it is distributed to a number of contact or filter beds.

The invention is herein shown as applied to that type of sewage purifying systems wherein a distributing chamber is employed which communicates with a plurality of contact beds, and wherein discharge devices are located between the distributing chamber and contact beds and are automatically controlled by the rise of the liquid sewage in the contact beds during the charging periods thereof.

As shown in the drawings:—Figure 1 is a vertical sectional view of a portion of a septic or settling tank, a distributing chamber and a contact bed of a sewage purifying system, illustrating the application of my invention thereto. Fig. 2 is a plan view of the parts shown in Fig. 3. Fig. 3 is a plan view of the distributing chamber and contact beds illustrating more particularly one of the discharge devices of the distributing chamber and its controlling mechanism.

As shown in the drawings, 10 designates the septic or settling tank and 11 the distributing chamber located at one side thereof and separated therefrom by a wall 12.

14 designates a contact bed located at one side of the distributing chamber and separated therefrom by a wall 15 which is provided with an opening 17 through which the liquid contents of the chamber are discharged upon the contact bed. The said distributing chamber is provided with an air-locked discharge device, designated as a whole by 17ª, through which the liquid sewage is discharged from the distributing chamber to the contact bed; the operation of said discharge device being controlled by the level of the liquid in the contact bed to which liquid is supplied by said device, and an associated contact bed, in the same general manner as set forth in the prior patent to Adams No. 648,325; dated April 24th, 1900. It will be understood that said distributing chamber is provided with a number of discharge devices equal to that of the contact beds and that the sewage is discharged through said devices upon the contact beds in a predetermined rotative order, as set forth in said prior Adams patent.

The discharge device 17ª embraces essentially an inverted U-shaped conduit having an intake end 18, an outlet end 19 and a horizontal connecting part 20. Said horizontal portion of the discharge device extends through a wall 21 which divides the main portion of the distributing chamber from a smaller chamber 22 into which the device discharges and which communicates directly, through the discharge opening 17, with the contact bed. The inlet and the outlet ends 18 and 19 of the discharge device are normally submerged and sealed by the liquid contained in the distributing chamber and the smaller chamber 22, respectively. Connected with each discharge device are two pressure transmitting pipes 24 and 25, the former of which communicates with a downwardly opening bell 26 located in the contact bed which is filled through said discharge device, and the latter of which is adapted to communicate with a like dome or bell 27 located in an adjacent contact bed; each contact bed being provided with two bells 26 and 27. The operation of a plurality of discharge devices arranged as described for controlling the passage of fluid alternately to the several contact beds is essentially the same as that described in the aforesaid Adams patent.

The liquid sewage is supplied from the septic or settling tank to the distributing chamber through the medium of an overhead feed device or siphon 30 which withdraws the liquid from the settling or septic tank near the surface thereof, the said feed device or siphon withdrawing from the tank 10 in each operation of the device a predetermined volume of liquid sufficient to fill the contact bed 14. Said feed device is located in and extends through an opening in the wall 12 near the top of the septic or settling tank. It comprises a substantially horizontal intake end 31 which opens into the septic or settling tank and a vertical outlet end 32 which is located within the distributing chamber. The outlet end of said device is submerged in and sealed by a body of liquid maintained at a fixed level in a sump or well 33, which, as herein shown, is located within the distributing chamber and is formed between the wall 12 and a vertical wall 34 which rises from the floor or bottom of the distributing chamber and extends to a height above the level of the outlet end of said feed device. The said siphon or feed device may enter the distributing chamber at any convenient or preferred point to feed the liquid sewage thereto, and the sump or well 33 may be made of any convenient dimensions or capacity. The inlet end of the feed device is provided with a depending lip 35, the distance between which and the bottom wall of said inlet end determines the capacity of the feed device. At the junction of the horizontal and vertical parts of the feed device is formed an invert or weir 37 which is located above the level of the lower margin of the depending lip 35, whereby when the liquid in the septic or settling tank rises above the level of said weir the inlet end of said feed device is sealed against the escape of air therefrom. The conduit of the feed device is horizontally elongated, as more clearly indicated in Fig. 2, thereby providing for the passage of a relatively large volume of liquid therethrough in a short period of time. Said feed device is provided with a trapped vent pipe, comprising a vertical member 38 which communicates at its upper end with the interior of the feed device and a short vertical member 39 which is open at its upper end to the atmosphere and communicates at its lower end with the pipe 38 by means of a transverse fitting 40. The trapped portion of said pipe is filled with liquid which constitutes a seal to prevent the escape of air from the feed device. The trapped vent pipe has a less depth of seal than the feed device, whereby said feed device is brought into operation under considerably less head than if the air from the feed device were blown or forced through the seal at its discharge end. Thus when drawing from a tank of large area a large volume of liquid may be discharged from the tank with a comparatively small loss of head.

Assuming the sump or well 33 to be filled with liquid and the vent pipe sealed, the operation of the apparatus is as follows: The liquid sewage in the septic or settling tank rises beyond the level of the intake end of the feed device without, however, flowing therethrough to the distributing chamber by reason of the fact that before the liquid reaches a level to flow over the invert or weir 37 both ends of the feed device are sealed, and the said device is therefore air-locked. The liquid continues to rise in the septic or settling tank until the head therein is sufficient to force the seal of the vent pipe of said feed device, whereupon the feed device is vented and a flow of liquid established therethrough to the distributing chamber. Such flow continues until the liquid level in the septic or settling tank falls below the depending lip 35 at the intake end of the feed device, whereupon air is admitted to the feed device and the flow of the liquid therethrough arrested. During the beginning of the flow of the liquid through the feed device, such flow is effected by gravity. After the liquid level in the septic tank has fallen below the level of the weir 37 the action of the feed device is that of a siphon, which action continues throughout the remaining portion of the operation of the feed device.

When my invention is embodied in a system such as here illustrated, the discharge devices 17ª in the distributing chamber are so controlled that one of said discharge devices is in condition to permit the flow of liquid therethrough at each intermittent discharge of liquid from the septic or settling tank to the distributing chamber, so that the liquid fed to the distributing chamber passes at once to one of the contact beds of the plant. The dose or charge of liquid sewage so transferred from the septic or settling tank to a contact bed during each intermittent period of flow of the sewage equals to the volume of sewage in the septic or settling tank between the maximum and minimum levels therein and the volume of liquid which flows into the septic or settling tank during the operation of the feed device. After each intermittent discharge of sewage from the septic or settling tank, through the distributing chamber, upon one of the contact beds takes place the flow of sewage through the feed device to the distributing chamber is not resumed until the level of the sewage in the septic or settling tank has again reached a height to furnish a head to force or blow the seal of the vent pipe of said feed device. With this construction and arrangement described, therefore, the contact beds are filled by a relatively large flow of liquid during a short period of time, and there intervenes between such intermittent periods of flow substantial periods of rest during which no flow takes place from the septic or settling tank to the distributing chamber.

The construction herein shown is characterized by the dipping of the discharge end of the feed device in a maintained body of liquid contained in a sump, whereby the discharge end of said device is permanently sealed. So far as this feature of my invention is concerned, other forms of discharging devices may be employed to control the flow of liquid from the distributing chamber, if such a distributing chamber be employed, or the liquid may pass at once from said sump to a contact or filter bed or other place for the disposal of the liquid.

The general arrangement of the overhead siphon arranged to intermittently discharge the liquid at the surface of the body of liquid contained in the septic or settling tank and to be sealed by the liquid in the chamber into which said siphon discharges, is not herein broadly claimed, but said subject-matter is claimed in my co-pending application filed of even date herewith, Serial No. 429,253.

I claim as my invention:—

1. The combination with a septic or settling tank, of an overhead siphon feed device for intermittently withdrawing surface liquid from a body of liquid in said tank, and a well or sump containing a maintained body of liquid into which the outlet end of said feed device dips and by which the feed device is sealed.

2. The combination with a septic or settling tank, of an overhead siphon feed device for intermittently withdrawing surface liquid from a body of liquid in said tank, a well or sump containing a maintained body of liquid into which the outlet end of said feed device dips and by which the feed device is sealed, and an automatic venting device controlled by the liquid head in said tank for venting said feed device.

3. The combination with a septic or settling tank, of an overhead siphon feed device for intermittently withdrawing surface liquid from a body of liquid in said tank, a well or sump containing a maintained body of liquid into which the outlet end of said feed device dips and by which the feed device is sealed, and a trapped vent pipe communicating with the interior of the feed device and having a less depth of seal than that of the feed device, for controlling the operation of the latter.

4. The combination with a septic or settling tank and a distributing chamber having means for controlling the discharge of liquid therefrom, of an overhead siphon feed device for intermittently withdrawing surface liquid from a body of liquid in said tank, a well or sump containing a maintained body of liquid which overflows into said distributing chamber, said feed device discharging through said sump and being sealed at its outer end by the liquid therein, and an automatic venting device controlled by the liquid head in said tank for venting said feed device, said vent device being operated by a less head than required to force the seal of the feed device.

5. In a sewage purifying system, the combination with a septic or settling tank and a distributing chamber provided with means for controlling the discharge of the contents thereof upon a contact or filter bed, of a feed device for intermittently feeding the liquid sewage from said tank to said distributing chamber, provided with an outlet end which is submerged in a maintained body of liquid contained in a sump or well in said distributing chamber.

6. In a sewage purifying system, the combination with a septic or settling tank and a distributing chamber provided with means for controlling the discharge of the contents thereof upon a contact or filter bed, of an overhead feed device for intermittently feeding the liquid sewage from the surface of the liquid in said tank to said distributing chamber, provided with an intake end which opens into said tank and with an outlet end which is submerged in and sealed by a maintained body of liquid contained in a sump or well in said distributing chamber, said feed device being provided between said intake and outlet ends with a weir located above the level of the highest part of said intake end.

7. In a sewage purifying system, the combination with a septic or settling tank and a distributing chamber provided with means for controlling the discharge of the contents thereof upon a contact or filter bed, of an overhead feed device for intermittently feeding the liquid sewage from the surface of the liquid in said tank to said distributing chamber, provided with an intake end which opens into said tank and with an outlet end which is submerged in and sealed by a maintained body of liquid contained in a sump or well in said distributing chamber, said feed device being provided between said intake and outlet ends with a weir located above the level of the highest part of said intake end, and a sealed vent pipe communicating with said feed device and having a depth of seal less than that of the feed device.

8. In a sewage purifying system, the combination with a septic or settling tank, a distributing chamber, contact beds and means controlled by the rise of liquid in said contact beds for discharging liquid sewage from the distributing chamber to the contact beds, of means for intermittently feeding the liquid sewage from said tank to said distributing chamber.

9. In a sewage purifying system, the combination with a septic or settling tank, a distributing chamber, contact beds and means controlled by the rise of liquid in said contact beds for discharging liquid sewage from the distributing chamber to the contact beds, of an overhead siphon device for intermittently feeding the liquid sewage from said tank to the distributing chamber.

10. In a sewage purifying system, the combination with a septic or settling tank, a distributing chamber, contact beds and means controlled by the rise of liquid in said contact beds for discharging liquid sewage from the distributing chamber to the contact beds, of an overhead feed device for intermittently feeding the liquid sewage from the surface of liquid in said tank to said distributing chamber, provided with an outlet end which is submerged in and sealed by a maintained body of liquid contained in a sump or well in said distributing chamber.

In testimony that I claim the foregoing as my invention I affix my signature in the presence of two witnesses, this 15th day of April A. D. 1908.

SAMUEL FISHER MILLER.

Witnesses:
W. L. HALL,
G. R. WILKINS.